(12) United States Patent
Bartsch et al.

(10) Patent No.: US 10,167,793 B2
(45) Date of Patent: Jan. 1, 2019

(54) EXHAUST-GAS-TURBOCHARGED INTERNAL COMBUSTION ENGINE WITH PARTIAL DEACTIVATION AND METHOD FOR OPERATING AN INTERNAL COMBUSTION ENGINE

(71) Applicant: Ford Global Technologies, LLC, Dearborn, MI (US)

(72) Inventors: Leonhard Bartsch, Aachen (DE); Rob Stalman, Selfkant (DE)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 15/219,872

(22) Filed: Jul. 26, 2016

(65) Prior Publication Data

US 2017/0030279 A1 Feb. 2, 2017

(30) Foreign Application Priority Data

Jul. 31, 2015 (DE) .................. 10 2015 214 616

(51) Int. Cl.
*F02B 33/44* (2006.01)
*F02D 17/02* (2006.01)
(Continued)

(52) U.S. Cl.
CPC ......... *F02D 41/0087* (2013.01); *F01N 13/08* (2013.01); *F02D 13/0249* (2013.01);
(Continued)

(58) Field of Classification Search
CPC ............ F02D 41/0084; F02D 41/0007; F02D 41/005; F02D 41/0082; F02D 13/0249; F02D 13/06; F02D 2041/001; F02D 2041/0012; F02D 2200/1002; F02D 2200/101; F02B 37/00; F02B 75/18;
(Continued)

(56) References Cited

U.S. PATENT DOCUMENTS

| 5,562,085 A * | 10/1996 | Kosuda .................. F02D 17/02 123/198 F |
| 6,513,471 B1 | 2/2003 | Hicks |

(Continued)

FOREIGN PATENT DOCUMENTS

| CN | 101078375 A | 11/2007 |
| DE | 102014215747 A1 | 2/2015 |
| EP | 2801714 A1 | 11/2014 |

OTHER PUBLICATIONS

An English Machine Translation the reference to Linsel et al. (Pub. No. EP2 801 714 A1), Published on Nov. 12, 2014.*

*Primary Examiner* — Thai Ba Trieu
(74) *Attorney, Agent, or Firm* — Julia Voutyras; McCoy Russell LLP (57) ABSTRACT

A method includes deactivating one or more cylinders of the second cylinder group responsive to engine operation in a first engine speed-load region, and adjusting exhaust valve timing of one or more cylinders of the first cylinder group responsive to the deactivating. The method further includes adjusting exhaust valve timing of the one or more cylinders of the first cylinder group responsive to engine operation in a second engine speed-load region, and deactivating the one or more cylinders of the second cylinder group responsive to the adjusting.

19 Claims, 3 Drawing Sheets (51) Int. Cl.
*F02D 9/10* (2006.01)
*F02D 41/00* (2006.01)
*F01N 13/08* (2010.01)
*F02D 13/02* (2006.01)
*F02D 13/06* (2006.01)
*F02M 26/05* (2016.01)
*F02M 26/06* (2016.01)
*F02B 75/18* (2006.01)
*F02B 37/00* (2006.01)
*F01N 3/021* (2006.01)

(52) U.S. Cl.
CPC ........... *F02D 13/06* (2013.01); *F02D 41/005* (2013.01); *F02D 41/0007* (2013.01); *F02D 41/0082* (2013.01); *F02M 26/05* (2016.02); *F02M 26/06* (2016.02); *F01N 3/021* (2013.01); *F01N 2430/02* (2013.01); *F02B 37/00* (2013.01); *F02B 75/18* (2013.01); *F02B 2075/1812* (2013.01); *F02D 2041/001* (2013.01); *F02D 2041/0012* (2013.01); *F02D 2200/101* (2013.01); *F02D 2200/1002* (2013.01); *Y02T 10/144* (2013.01); *Y02T 10/18* (2013.01); *Y02T 10/47* (2013.01)

(58) Field of Classification Search
CPC ............ F02B 2075/1812; F02M 26/05; F02M 26/06; F01N 13/08; F01N 3/021; F01N 2430/02; Y02T 10/144; Y02T 10/18; Y02T 10/47
USPC ...................... 60/605.2, 323; 123/198 F, 336
See application file for complete search history.

(56) References Cited

U.S. PATENT DOCUMENTS

| | | | |
|---|---|---|---|
| 6,595,184 B1* | 7/2003 | Kondo | F02D 9/105 123/336 |
| 6,622,695 B2* | 9/2003 | Kondo | F02D 11/105 123/336 |
| 7,028,678 B2* | 4/2006 | Betz | F02D 17/02 123/198 F |
| 7,121,258 B2* | 10/2006 | Nakamoto | F02D 11/105 123/336 |
| 7,418,945 B2* | 9/2008 | Elsasser | F02B 29/083 123/336 |
| 8,528,530 B2* | 9/2013 | Freund | F02M 26/43 60/605.2 |
| 2007/0175442 A1* | 8/2007 | Vichinsky | F02D 11/06 123/336 |
| 2009/0173313 A1 | 7/2009 | Bohme et al. | |
| 2014/0137819 A1 | 5/2014 | McConville et al. | |

* cited by examiner

EXHAUST-GAS-TURBOCHARGED INTERNAL COMBUSTION ENGINE WITH PARTIAL DEACTIVATION AND METHOD FOR OPERATING AN INTERNAL COMBUSTION ENGINE

CROSS REFERENCE TO RELATED APPLICATION

This application claims priority to German Patent Application No. 102015214616.2, filed Jul. 31, 2015, the entire contents of which are hereby incorporated by reference for all purposes.

FIELD

The disclosure relates to a supercharged internal combustion engine.

BACKGROUND/SUMMARY

Supercharging is a suitable means for increasing the power of an internal combustion engine while maintaining an unchanged swept volume, or for reducing the swept volume while maintaining the same power. In any case, supercharging leads to an increase in volumetric power output and a more expedient power-to-weight ratio. If the swept volume is reduced, it is thus possible, given the same vehicle boundary conditions, to shift the load collective toward higher loads, at which the specific fuel consumption is lower.

Internal combustion engines may be supercharged by exhaust-gas turbocharging. The advantage of an exhaust-gas turbocharger for example in comparison with a mechanical charger is that no mechanical connection for transmitting power is required between the charger and internal combustion engine. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases.

Supercharged internal combustion engines are preferably equipped with a charge-air cooling arrangement by means of which the compressed combustion air is cooled before it enters the cylinders. In this way, the density of the supplied charge air is increased further. In this way, the cooling likewise contributes to a compression and improved charging of the combustion chambers, that is to say to an improved volumetric efficiency. It may be advantageous for the charge-air cooler to be equipped with a bypass line in order to be able to bypass the charge-air cooler if required, for example after a cold start.

In the development of internal combustion engines, it is a basic aim to minimize fuel consumption, wherein the emphasis in the efforts being made is on obtaining an improved overall efficiency.

Fuel consumption and thus efficiency pose a problem in particular in the case of Otto-cycle engines, that is to say in the case of an applied-ignition internal combustion engine. The reason for this lies in the fundamental operating process of the Otto-cycle engine. Load control is generally carried out by means of a throttle flap provided in the intake system. By adjusting the throttle flap, the pressure of the inducted air downstream of the throttle flap can be reduced to a greater or lesser extent. The further the throttle flap is closed, that is to say the more the throttle flap blocks the intake system, the higher the pressure loss of the inducted air across the throttle flap, and the lower the pressure of the inducted air downstream of the throttle flap and upstream of the inlet into the at least three cylinders, that is to say combustion chambers. For a constant combustion chamber volume, it is possible in this way for the air mass, that is to say the quantity, to be set by means of the pressure of the inducted air. This also explains why quantity regulation has proven to be disadvantageous specifically in part-load operation, because low loads require a high degree of throttling and a pressure reduction in the intake system, as a result of which the charge exchange losses increase with decreasing load and increasing throttling.

To reduce the described losses, various strategies for dethrottling an applied-ignition internal combustion engine have been developed.

One approach to a solution for dethrottling the Otto-cycle engine is for example an Otto-cycle engine operating process with direct injection. The direct injection of the fuel is a suitable means for realizing a stratified combustion chamber charge. The direct injection of the fuel into the combustion chamber thus permits quality regulation in the Otto-cycle engine, within certain limits. The mixture formation takes place by the direct injection of the fuel into the cylinders or into the air situated in the cylinders, and not by external mixture formation, in which the fuel is introduced into the inducted air in the intake system.

Another option for optimizing the combustion process of an Otto-cycle engine consists in the use of an at least partially variable valve drive. By contrast to conventional valve drives, in which both the lift of the valves and the timing are invariable, these parameters which have an influence on the combustion process, and thus on fuel consumption, can be varied to a greater or lesser extent by variable valve drives. If the closing time of the inlet valve and the inlet valve lift can be varied, this alone makes throttling-free and thus loss-free load control possible. The mixture mass which flows into the combustion chamber during the intake process is then controlled not by a throttle flap but rather by the inlet valve lift and the opening duration of the inlet valve.

A further approach to a solution for dethrottling an Otto-cycle engine is offered by cylinder deactivation, that is to say the deactivation of individual cylinders in certain load ranges. The efficiency of the Otto-cycle engine in part-load operation can be improved, that is to say increased, by a partial deactivation because the deactivation of one cylinder of a multi-cylinder internal combustion engine increases the load on the other cylinders, which remain in operation, if the engine power remains constant, such that the throttle flap may be opened further in order to introduce a greater air mass into the cylinders, whereby dethrottling of the internal combustion engine is attained overall. During the partial deactivation, the cylinders which are permanently in operation furthermore operate in the region of higher loads, at which the specific fuel consumption is lower. The load collective is shifted toward higher loads.

The cylinders which remain in operation during the partial deactivation furthermore exhibit improved mixture formation owing to the greater air mass or mixture mass supplied.

Further advantages with regard to efficiency are attained in that a deactivated cylinder, owing to the absence of combustion, does not generate any wall heat losses owing to heat transfer from the combustion gases to the combustion chamber walls.

Even though diesel engines, that is to say auto-ignition internal combustion engines, owing to the quality regulation on which they are based, exhibit greater efficiency, that is to say lower fuel consumption, than Otto-cycle engines in which the load—as described above—is adjusted by throttling or quantity regulation with regard to the charging of the cylinders, there is, even in the case of diesel engines, potential for improvement and a demand for improvement with regard to fuel consumption and efficiency.

One concept for reducing fuel consumption, also in the case of diesel engines, is cylinder deactivation, that is to say the deactivation of individual cylinders in certain load ranges. The efficiency of the diesel engine in part-load operation can be improved, that is to say increased, by a partial deactivation, because, even in the case of the diesel engine, in the case of constant engine power the deactivation of at least one cylinder of a multi-cylinder internal combustion engine increases the load on the other cylinders still in operation, such that the cylinders operate in regions of higher loads, in which the specific fuel consumption is lower. The load collective in part-load operation of the diesel engine is shifted toward higher loads.

With regard to the wall heat losses, the same advantages are attained as in the case of the Otto-cycle engine, for which reason reference is made to the corresponding statements given.

In the case of diesel engines, the partial deactivation is also intended to prevent the fuel-air mixture from becoming too lean as part of the quality regulation in the event of decreasing load as a result of a reduction of the fuel quantity used.

The inventors herein have recognized that the multi-cylinder internal combustion engines with partial deactivation described in above, and the associated methods for operating the internal combustion engines, nevertheless have considerable potential for improvement, as will be explained briefly below on the basis of a diesel engine as an example.

In a direct-injection diesel engine, if, for the purpose of the partial deactivation, the fuel supply to the deactivatable cylinders is stopped, that is to say discontinued, the deactivated cylinders continue to participate in the charge exchange if the associated valve drive of the cylinders is not deactivated or cannot be deactivated. The charge exchange losses thus generated lessen, and counteract, the improvements achieved with regard to fuel consumption and efficiency by the partial deactivation, such that the benefit of the partial deactivation is at least partially lost, that is to say the partial deactivation in fact yields an altogether less pronounced improvement.

To remedy the disadvantageous effects described above, it may be expedient for switchable valve drives to be provided at the inlet side and at the outlet side, by which valve drives the deactivated cylinders are held closed, and thus no longer participate in the charge exchange, during the partial deactivation.

However, in the case of internal combustion engines supercharged by exhaust-gas turbocharging, switchable valve drives can lead to further problems because the turbine of an exhaust-gas turbocharger is configured for a certain exhaust-gas flow rate, and thus also for a certain number of cylinders. If the valve drive of a deactivated cylinder is deactivated, the overall mass flow through the cylinders of the internal combustion engine is reduced owing to the omission of the mass flow through the deactivated cylinders. The exhaust-gas mass flow conducted through the turbine decreases, and the turbine pressure ratio generally also decreases as a result. A decreasing turbine pressure ratio has the effect that the charge pressure ratio likewise decreases, that is to say the charge pressure falls, and only a small amount of charge air, or less charge air than intended, is supplied to the cylinders that remain operational. The small charge-air flow may also have the effect that the compressor operates beyond the surge limit.

Increasing again the overall mass flow conducted through the cylinders of the internal combustion engine during partial deactivation by virtue of the deactivated cylinders continuing to participate in the charge exchange is not expedient because the relatively cool charge air conducted through the deactivated cylinders considerably reduces the enthalpy of the exhaust-gas flow provided to the turbine. Here, it must be taken into consideration that the exhaust-gas enthalpy of the hot exhaust gases is determined significantly by the exhaust-gas pressure and the exhaust-gas temperature. The exhaust-gas mass is consequently not the only relevant aspect when considering the problem in question.

The effects described above lead to a restriction of the practicability of the partial deactivation, specifically to a restriction of the load range in which the partial deactivation can be used. A reduced charge-air flow rate that is supplied to the cylinders which are operational during the partial deactivation reduces the effectiveness or the quality of the combustion and has an adverse effect on the fuel consumption and pollutant emissions.

The charge pressure during partial deactivation, and thus the charge-air flow rate supplied to the cylinders that remain operational, could for example be increased by a small configuration of the turbine cross section and by simultaneous exhaust-gas blow-off, whereby the load range relevant for a partial deactivation would also be expanded again. This approach however has the disadvantage that the supercharging behavior is inadequate when all the cylinders are operated.

The charge pressure during partial deactivation, and thus the charge-air flow rate supplied to the cylinders that are still operational, could also be increased by virtue of the turbine being equipped with a variable turbine geometry, which permits an adaptation of the effective turbine cross section to the present exhaust-gas flow. The exhaust-gas back pressure in the exhaust-gas discharge system upstream of the turbine would then however simultaneously increase, leading in turn to higher charge-exchange losses in the cylinders that are still operational.

Accordingly, the inventors herein provide a method to at least partly address the above issues. In one example, a method for an engine having a first cylinder group and a second cylinder group includes responsive to engine operation in a first engine speed-load region, deactivating one or more cylinders of the second cylinder group, and responsive to the deactivating, adjusting exhaust valve timing of one or more cylinders of the first cylinder group. The method further includes responsive to engine operation a second engine speed-load region, adjusting exhaust valve timing of the one or more cylinders of the first cylinder group, and responsive to the adjusting, deactivating the one or more cylinders of the second cylinder group.

In another example, a supercharged internal combustion engine includes at least three cylinders, each cylinder having at least one outlet opening which is adjoined by an exhaust line for discharging exhaust gases via an exhaust-gas discharge system, each cylinder further having at least one inlet opening which is adjoined by an intake line for supply of charge air via an intake system, the at least three cylinders arranged into at least two groups with in each case at least one cylinder, each cylinder of a first group of the at least two groups being a cylinder which is in operation even in the event of partial deactivation of the internal combustion engine, and each cylinder of a second group of the at least two groups being formed as a load-dependently switchable cylinder, at least one outlet opening of at least one cylinder of the first group equipped with an at least partially variable valve drive, with an oscillating outlet valve which opens up or shuts off an associated outlet opening and which is adjustable at least with regard to a control time for opening, the oscillating outlet valve realizing a valve lift $\Delta h1,ex$ between an open position and a closed position and opening up the associated outlet opening during an opening duration $\Delta t1,_{ex}$. The internal combustion engine further includes an exhaust-gas turbocharger comprising a turbine arranged in the exhaust-gas discharge system and a compressor arranged in the intake system; an exhaust-gas recirculation arrangement, and a controller storing instructions that when executed cause the controller to, during a first condition, deactivate at least one cylinder of the second cylinder group, and responsive to the deactivation, adjust the at least partially variable valve drive to open the associated outlet opening relatively early.

In the internal combustion engine according to the disclosure, at least one outlet opening of a cylinder that is operational even during partial deactivation of the internal combustion engine is equipped with an at least partially variable valve drive, the outlet valve of which is adjustable at least with regard to the control time for opening.

This makes it possible, during the operation of the partially deactivated internal combustion engine, for the at least one adjustable outlet valve of the first cylinder group to be opened relatively early. By this measure, the temperature of the exhaust gas supplied to the turbine can be increased, such that exhaust gas of greater enthalpy is made available at the turbine inlet of the at least one exhaust-gas turbocharger.

A greater exhaust-gas enthalpy yields a higher turbine pressure ratio, and thus a higher charge pressure ratio, as a result of which more charge air can be or is supplied to the cylinders that remain operational during partial deactivation, specifically even if the deactivated cylinders no longer participate in the charge exchange and the mass flow through the internal combustion engine is greatly reduced. Surging of the compressor can be prevented. The load range in which the partial deactivation can be effectively used is expanded. The torque characteristic of the supercharged internal combustion engine during the partial deactivation is considerably improved.

If the at least one adjustable outlet valve is, during the partial deactivation, opened while combustion is still taking place, then during the course of the charge exchange of the first group, fuel-air mixture that is still in the process of combustion is discharged into the exhaust-gas discharge system, and the energy or heat bound in the fuel is released in the exhaust-gas discharge system, and thus close to the turbine. The effect which is intended according to the disclosure, and which is achieved, specifically that of increasing the exhaust-gas enthalpy, is then particularly pronounced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An internal combustion engine of the stated type is used as a motor vehicle drive unit. Within the context of the present invention, the expression "internal combustion engine" encompasses diesel engines but also Otto-cycle engines and hybrid internal combustion engines, that is to say internal combustion engines that are operated using a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

The internal combustion engine according to the disclosure may be equipped with at least one exhaust-gas recirculation arrangement which comprises a recirculation line which branches off from the exhaust-gas discharge system and opens into the intake system.

Exhaust-gas recirculation, that is to say the recirculation of combustion gases, is a suitable means for reducing the nitrogen oxide emissions, wherein it is possible for the nitrogen oxide emissions to be considerably reduced with increasing exhaust-gas recirculation rate. Here, the exhaust-gas recirculation rate $X_{EGR}$ is determined as $X_{EGR}=m_{EGR}/(m_{EGR}+m_{fresh\ air})$, where $m_{EGR}$ denotes the mass of recirculated exhaust gas and $m_{fresh\ air}$ denotes the supplied fresh air which, if appropriate, is conducted through a compressor and compressed. To obtain a considerable reduction in nitrogen oxide emissions, high exhaust-gas recirculation rates are required which may be of the order of magnitude of $X_{EGR}\approx60\%$ to 70%.

Here, embodiments of the internal combustion engine are provided in which a valve for adjusting the recirculated exhaust-gas flow rate is arranged in the recirculation line of the exhaust-gas recirculation arrangement.

The internal combustion engine according to the disclosure may have at least three cylinders or at least two groups with in each case at least one cylinder. In this respect, internal combustion engines with three cylinders which are configured in three groups with in each case one cylinder, or internal combustion engines with six cylinders which are configured in three groups with in each case two cylinders, are likewise internal combustion engines according to the disclosure. Within the context of a partial deactivation, the three cylinder groups may be activated or deactivated in succession, whereby two-time switching may also be realized. The partial deactivation is thereby further optimized. The cylinder groups may also comprise a different number of cylinders.

The embodiment according to the disclosure of the internal combustion engine optimizes the efficiency of the internal combustion engine in part-load operation, that is to say at low loads, wherein a low load $T_{low}$ is preferably a load which amounts to less than 50%, preferably less than 30%, of the maximum load $T_{max,n}$ at the present engine speed n.

Embodiments of the supercharged internal combustion engine are provided in which at least one outlet opening of each cylinder of the first group is equipped with an at least partially variable valve drive, with an outlet valve which opens up or shuts off the associated outlet opening and which is adjustable at least with regard to the control time for opening, an oscillating outlet valve realizing a valve lift $\Delta h_{1,ex}$ between an open position and a closed position and opening up the associated outlet opening during an opening duration $\Delta t_{1,ex}$.

In the above embodiment, each cylinder of the first group has at least one outlet valve which is adjustable with regard to the control time for opening, even though the effect which is intended according to the disclosure, that of increasing the exhaust-gas enthalpy, can be achieved even if only one cylinder of the first group has an outlet valve of the type, or not all of the cylinders of the first group have an outlet valve of the type. Nevertheless, the intended effect is all the more pronounced the more cylinders of the first group have an outlet valve of the type.

Embodiments of the supercharged internal combustion engine are therefore also provided in which each outlet opening of each cylinder of the first group is equipped with an at least partially variable valve drive, with an outlet valve which opens up or shuts off the associated outlet opening and which is adjustable at least with regard to a control time for opening, an oscillating outlet valve realizing a valve lift $\Delta h_{1,ex}$ between an open position and a closed position and opening up the associated outlet opening during an opening duration $\Delta t_{1,ex}$.

In the above embodiment, each outlet opening of each cylinder of the first group has an outlet valve which is adjustable with regard to the control time for opening.

Embodiments of the supercharged internal combustion engine are provided in which each outlet valve of an at least partially variable valve drive of a cylinder of the first group is an outlet valve which is adjustable with regard to the opening. An outlet valve which is adjustable with regard to the opening is adjustable at least with regard to the control time for opening, but possibly also with regard to the opening duration and/or the speed with which the outlet valve is opened.

Embodiments of the supercharged internal combustion engine are therefore provided in which each outlet valve of an at least partially variable valve drive of a cylinder of the first group is an outlet valve which is adjustable with regard to the opening duration $\Delta t_{1,ex}$.

In this connection, embodiments of the supercharged internal combustion engine are provided in which the outlet valve is an outlet valve which is adjustable with regard to the opening duration $\Delta t_{1,ex}$ in two-stage fashion.

Two different opening durations of an outlet valve can be realized for example by way of two different cams, with switching between the cams being performed when the partial deactivation is initiated and ended. The different cam profiles can change both the control time for opening and the control time for closing, or else merely vary the control time for opening while maintaining the control time for closing.

Embodiments of the supercharged internal combustion engine are also provided in which the outlet valve is an outlet valve which is adjustable with regard to the opening duration $\Delta t_{1,ex}$ in multi-stage fashion.

In particular, embodiments of the supercharged internal combustion engine are provided in which the outlet valve is an outlet valve which is adjustable with regard to the opening duration $\Delta t_{1,ex}$ in continuous fashion.

Embodiments of the supercharged internal combustion engine are provided in which each outlet opening of each cylinder of the second group is equipped with an at least partially variable valve drive, with an outlet valve which opens up or shuts off the associated outlet opening, an oscillating outlet valve realizing a valve lift $\Delta h_{2,ex}$ between an open position and a closed position and opening up the associated outlet opening during an opening duration $\Delta t_{2,ex}$.

An outlet valve actuated by way of an at least partially variable valve drive may also serve for preventing or reducing an undesired backflow of exhaust gas into a deactivated cylinder of the second group. Furthermore, the charge exchange losses of a deactivated cylinder can be reduced through suitable control of the outlet valve. The opening of an outlet valve should preferably be prevented when, in the associated deactivated cylinder, negative pressure prevails or a pressure prevails which is lower than that in the exhaust-gas discharge system.

An outlet valve can control the discharge of the exhaust gas out of a cylinder, which is deactivated during partial deactivation of the internal combustion engine, of the second group. Strictly speaking, however, it is not hot exhaust gas but rather charge air that is discharged during the partial deactivation. However, at least during the first working cycle of the partial deactivation, the exhaust gas of the preceding working cycle, and thus the hot exhaust gas of the most recent fired working cycle, is discharged via the exhaust-gas discharge system. Then, charge air is discharged during the following working cycles of the partial deactivation, if at all.

In this context, embodiments of the supercharged internal combustion engine are provided in which each outlet valve of an at least partially variable valve drive of a cylinder of the second group is a switchable outlet valve, wherein a deactivated outlet valve shuts off the associated outlet opening and an activated outlet valve opens up the associated outlet opening during an opening duration $\Delta t_{2,ex}$, and in the process forms a valve lift $\Delta h_{2,ex}$.

In this context, embodiments of the supercharged internal combustion engine are also provided in which each outlet valve of an at least partially variable valve drive of a cylinder of the second group is an outlet valve which is adjustable in terms of the opening duration $\Delta t_{2,ex}$ and/or the valve lift $\Delta h_{2,ex}$.

An outlet valve which is adjustable in terms of the valve lift $\Delta h_{2,ex}$ basically exhibits the normal lift in the case of activated cylinders. Furthermore, a lifting valve of the type permits at least one further actuation with reduced lift. That is to say, an outlet valve which is adjustable in the above sense is an outlet valve which permits at least two different valve lifts $\Delta h_{2,ex}$. An activatable outlet valve which exhibits zero lift in the deactivated state is thus likewise an outlet valve which is adjustable in terms of the valve lift $\Delta h$. In particular, embodiments may be provided in which the outlet valve in question is not a deactivatable valve.

An outlet valve which is adjustable with regard to the opening duration $\Delta t_{2,ex}$ makes it possible to realize at least two different opening durations. In the case of an activated cylinder group, it is basically the case that a normal opening duration is realized, that is to say an opening duration such as for example the opening duration of the outlet openings of the other first cylinder group. Furthermore, at least one further actuation with a shortened opening duration is possible. A deactivated outlet valve, which is not actuated and thus not opened, has an opening duration of zero. In particular, embodiments may be provided in which the outlet valve in question is not a deactivatable valve.

Embodiments are provided in which each outlet valve of an at least partially variable valve drive of a cylinder of the second group is an outlet valve which is adjustable in staged fashion, in particular an outlet valve which is adjustable in two-stage fashion, or an outlet valve which is adjustable in continuous fashion.

Embodiments of the supercharged internal combustion engine are provided in which an outlet-side throttle element is provided in the at least one exhaust line of the at least one load-dependently switchable cylinder, by which throttle element the size of the flow cross section of the exhaust line can be varied and by which throttle element the discharge from the at least one deactivated cylinder of the second group in the event of partial deactivation of the internal combustion engine can be controlled.

In the present case, at least one outlet-side throttle element is arranged in the exhaust-gas discharge system of the at least one load-dependently switchable cylinder. Whereas an inlet-side throttle element controls the supply of charge air to a deactivated cylinder, that is to say reduces or possibly even eliminates the charge-air flow rate supplied during partial deactivation, an outlet-side throttle element serves to prevent or reduce an undesired backflow of exhaust gas into a deactivated cylinder of the second group. Furthermore, the charge exchange losses of a deactivated cylinder can be reduced through suitable control of the outlet-side throttle element. The opening of an outlet-side throttle element may be prevented when, in the associated deactivated cylinder, negative pressure prevails or a pressure prevails which is lower than that in the exhaust-gas discharge system between the cylinder and the outlet-side throttle element. The provision of at least one outlet-side throttle element has cost advantages in relation to partially variable or switchable valve drives.

Embodiments of the supercharged internal combustion engine are provided in which each inlet opening of each cylinder of the second group is equipped with an at least partially variable valve drive, with an inlet valve which opens up or shuts off the associated inlet opening, an oscillating inlet valve realizing a valve lift $\Delta h_{2,in}$ between an open position and a closed position and opening up the associated inlet opening during an opening duration $\Delta t_{2,in}$.

The statements made in conjunction with an adjustable outlet valve apply analogously. In this respect, reference is made to the corresponding statements, in particular with regard to the adjustability of the outlet valves of the second cylinder group.

In this context, embodiments of the supercharged internal combustion engine are provided in which each inlet valve of an at least partially variable valve drive of a cylinder of the second group is a switchable inlet valve, wherein a deactivated inlet valve shuts off the associated inlet opening and an activated inlet valve opens up the associated inlet opening during an opening duration $\Delta t_{2,in}$, and in the process forms a valve lift $\Delta h_{2,in}$.

In this context, embodiments of the supercharged internal combustion engine are also provided in which each inlet valve of an at least partially variable valve drive of a cylinder of the second group is an inlet valve which is adjustable in terms of the opening duration $\Delta t_{2,in}$ and/or the valve lift $\Delta h_{2,in}$.

Embodiments of the supercharged internal combustion engine are provided in which an inlet-side throttle element is provided in the at least one intake line of the at least one load-dependently switchable cylinder, by which throttle element the size of the flow cross section of the intake line can be varied, whereby the charge-air flow rate supplied to the at least one deactivated cylinder in the event of partial deactivation of the internal combustion engine can be adjusted.

In the above embodiment, a throttle element is provided in the at least one intake line of each load-dependently switchable cylinder, by which throttle element the size of the flow cross section of the intake line can be varied, whereby the charge-air flow rate supplied to the deactivated cylinder in the event of partial deactivation of the internal combustion engine can be adjusted. In this way, it is possible for the supply of charge air to the deactivated cylinders, that is to say the charge-air flow rate supplied during partial deactivation, to be reduced and controlled, possibly even eliminated entirely, without the switchable cylinders having to be equipped with switchable valve drives at the inlet side.

Through actuation of the throttle element provided in the intake line of a deactivated cylinder, the flow cross section of the intake line is varied, in particular reduced in size, whereby the charge-air flow rate supplied to the deactivated cylinder during the partial deactivation can be adjusted, metered and controlled.

The deactivated cylinders can continue to participate in the charge exchange if the valve drives of the cylinders continue to be actuated, that is to say continue to operate, and are not deactivated together with the cylinders. The supply of charge air may however be reduced, as described above, by a throttle element. Less charge air or no charge air is supplied, in order that the charge exchange losses of the deactivated cylinders are reduced.

The reduced charge-air flow through the at least one deactivated cylinder leads—in relation to an unchanged charge-air flow with the intake line fully open—to reduced heat transfer owing to convection, such that the deactivated cylinders do not cool down, or cool down to a lesser extent, during the partial deactivation. This has advantages in particular with regard to pollutant emissions, in particular with regard to the emissions of unburned hydrocarbons, because the deactivated cylinders reach or exhibit their operating temperature again immediately after the end of the partial deactivation.

The reduction of the charge-air flow by means of a throttle element has, in relation to internal combustion engines in which the charge-air supply is prevented entirely by switchable valve drives, the advantage that the mass flow through the internal combustion engine is greater in the case of a reduction of the charge-air supply than in the case of the supply of charge air being prevented entirely.

In the case of internal combustion engines supercharged by exhaust-gas turbocharging, the greater mass flow leads to a higher turbine pressure ratio and thus to a higher charge pressure, such that a greater charge-air flow rate can be provided to the cylinders that are operational during partial deactivation. This also expands the range of applicability of the partial deactivation, specifically the load range in which partial deactivation can be used, and improves the quality of the combustion and thus the consumption and emissions characteristics of the internal combustion engine.

Embodiments of the internal combustion engine are also provided in which the at least one inlet-side throttle element is a valve or a pivotable flap, which is adjustable in preferably two-stage or continuous fashion. The metering of the charge-air flow rate may be performed in an operating point-specific manner, in particular with regard to the lowest possible charge exchange losses and/or a required charge pressure. The control of the throttle element may take into consideration the load T, the engine speed n, the coolant temperature in the case of a liquid-cooled internal combustion engine, the oil temperature, and/or the like.

In the case of supercharged internal combustion engines having four cylinders in an in-line arrangement, embodiments are provided in which the two outer cylinders and the two inner cylinders form in each case one group.

Embodiments of the supercharged internal combustion engine are provided in which at least two exhaust-gas turbochargers are provided which each comprise a turbine arranged in the exhaust-gas discharge system and a compressor arranged in the intake system.

Problems are generally encountered in the configuration of the exhaust-gas turbocharging arrangement, wherein it is basically sought to obtain a noticeable performance increase in all engine speed ranges. A severe torque drop is commonly observed in the event of a certain engine speed being undershot. The torque characteristic of a supercharged internal combustion engine can be improved through various measures, for example by virtue of a plurality of exhaust-gas turbochargers being provided in a parallel and/or series arrangement in the exhaust-gas discharge system.

The torque characteristic of a supercharged internal combustion engine may be improved by multiple turbochargers arranged in parallel, that is to say by multiple turbines of relatively small turbine cross section arranged in parallel, turbines being activated successively with increasing exhaust-gas flow rate, similarly to sequential supercharging.

The torque characteristic may also be advantageously influenced by multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

Embodiments of the internal combustion engine are provided in which at least one exhaust-gas aftertreatment system, for example an oxidation catalytic converter, a three-way catalytic converter, a storage catalytic converter, a selective catalytic converter and/or a particle filter, is provided in the exhaust-gas discharge system.

In the case of internal combustion engines having at least one exhaust-gas turbocharger and an exhaust-gas recirculation arrangement, embodiments are provided in which the recirculation line of the exhaust-gas recirculation arrangement branches off from the exhaust-gas discharge system upstream of the turbine of the at least one exhaust-gas turbocharger and issues into the intake system downstream of the compressor. In the case of the so-called high-pressure EGR arrangement, the exhaust gas is extracted from the exhaust-gas discharge system upstream of the turbine and is fed into the intake system downstream of the compressor, whereby the exhaust gas need not be subjected to exhaust-gas aftertreatment, in particular supplied to a particle filter, before being recirculated, because there is no risk of fouling of the compressor.

In the case of the operation of an internal combustion engine with exhaust-gas turbocharging and the simultaneous use of high-pressure EGR, a conflict may however arise because the recirculated exhaust gas is no longer available for driving the turbine. In the event of an increase in the exhaust-gas recirculation rate, the exhaust-gas flow introduced into the turbine decreases. The reduced exhaust-gas mass flow through the turbine leads to a lower turbine pressure ratio, as a result of which the charge-pressure ratio also falls, which equates to a smaller charge-air flow.

One solution to this is so-called low-pressure EGR. By contrast to high-pressure EGR, in the case of low-pressure EGR, exhaust gas which has already flowed through the turbine is introduced into the intake system. For this purpose, the low-pressure EGR arrangement has a recirculation line which branches off from the exhaust-gas discharge system downstream of the turbine and issues into the intake system preferably upstream of the compressor.

The exhaust gas which is recirculated via the low-pressure EGR arrangement to the inlet side is mixed with fresh air. The mixture of fresh air and recirculated exhaust gas produced in this way forms the charge air which is supplied to the compressor and compressed.

Since, within the low-pressure EGR arrangement, exhaust gas is commonly conducted through the compressor, the exhaust gas may be previously subjected to exhaust-gas aftertreatment, in particular in a particle filter. Depositions in the compressor which change the geometry of the compressor, in particular the flow cross sections, and thereby impair the efficiency of the compressor, may be prevented.

For the reasons stated above, embodiments of the internal combustion engine are provided in which the recirculation line of the exhaust-gas recirculation arrangement branches off from the exhaust-gas discharge system downstream of the turbine of the at least one exhaust-gas turbocharger and issues into the intake system upstream of the compressor.

Embodiments of the supercharged internal combustion engine are provided in which each cylinder is equipped with a direct-injection means for the introduction of fuel. Here, embodiments are provided in which each cylinder is equipped with an injection nozzle for the purposes of direct injection.

The fuel supply can be deactivated more quickly and more reliably, for the purposes of the partial deactivation, in the case of direct-injection internal combustion engines than in the case of internal combustion engines with intake pipe injection, in which fuel residues in the intake pipe can lead to undesired combustions in the deactivated cylinder.

Nevertheless, embodiments of the internal combustion engine may be provided in which an intake pipe injection device is provided for the purposes of supplying fuel.

A method for operating an internal combustion engine of an above-described type, is achieved by way of a method in which each outlet valve of an at least partially variable valve drive of a cylinder of the first group is, during the partial deactivation, opened relatively early.

That which has already been stated with regard to the internal combustion engine according to the disclosure also applies to the method according to the disclosure, for which reason reference is generally made at this juncture to the statements made above with regard to the internal combustion engine. The different internal combustion engines require, in part, different method variants.

Method variants are provided in which each outlet valve of an at least partially variable valve drive of a cylinder of the first group is, during the partial deactivation, opened while combustion is still taking place. Then, during the course of the charge exchange of the first group, fuel-air mixture that is still in the process of combustion is discharged into the exhaust-gas discharge system, and the energy or heat bound in the fuel is released in the exhaust-gas discharge system, and thus close to the turbine.

Method variants are basically advantageous in which the at least one switchable cylinder of the second group is switched as a function of the load T of the internal combustion engine, in such a way that the at least one switchable cylinder is deactivated if a predefinable load $T_{down}$ is undershot and is activated if a predefinable load $T_{up}$ is exceeded.

The limit loads $T_{down}$ and $T_{up}$ predefined for the undershooting and exceedance respectively may be of equal magnitude, though may also differ in magnitude. When the internal combustion engine is in operation, the cylinders of the first cylinder group are cylinders which are permanently in operation. Switching of the second cylinder group, that is to say an activation and deactivation of the second group, takes place.

Embodiments of the method are provided in which the predefinable load $T_{down}$ and/or $T_{up}$ is dependent on the engine speed n of the internal combustion engine. Then, there is not only one specific load, upon the undershooting or exceedance of which switching takes place regardless of the engine speed n. Instead, an engine-speed-dependent approach is followed, and a region in the characteristic map is defined in which partial deactivation takes place.

It is basically possible for further operating parameters of the internal combustion engine, for example the engine temperature or the coolant temperature after a cold start of the internal combustion engine, to be used as a criterion for a partial deactivation.

Method variants are provided in which the at least one cylinder of the second group is deactivated when the predefined load $T_{down}$ is undershot and the present load is lower than the predefined load $T_{down}$ for a predefinable time period.

The introduction of an additional condition for the deactivation of the cylinders of the second group, that is to say the partial deactivation, is intended to prevent excessively frequent activation and deactivation, in particular a partial deactivation, if the load falls below the predefined load $T_{down}$ only briefly and then rises again, or fluctuates around the predefined value for the load $T_{down}$, without the undershooting justifying or necessitating a partial deactivation.

For these reasons, method variants are likewise provided in which the at least one cylinder of the second group is activated when the predefined load $T_{up}$ is exceeded and the present load is higher than the predefined load $T_{up}$ for a predefinable time period.

Embodiments of the method are provided in which each outlet opening of each cylinder of the second group and each inlet opening of each cylinder of the second group is held closed during the partial deactivation. For this purpose, the cylinders of the second group should be, or are, equipped at the inlet side and at the outlet side with valve drives that are switchable in at least two-stage fashion.

Method variants may also be provided in which a predefinable minimum flow rate of charge air, and no less, is supplied to the at least one deactivated cylinder.

Embodiments of the method are provided in which the charge-air flow rate supplied to the at least one deactivated cylinder is co-determined by the load T, the engine speed n, the coolant temperature, the oil temperature, the engine temperature and/or the like.

Method variants are provided in which, for the purposes of partial deactivation, firstly, a fuel supply to the at least one switchable cylinder is deactivated. This yields advantages with regard to fuel consumption and pollutant emissions, thus assisting the aim pursued by the partial deactivation, specifically that of reducing fuel consumption and improving efficiency. In the case of auto-ignition internal combustion engines, it may even be necessary to deactivate the fuel supply in order to reliably prevent an ignition of the mixture situated in the cylinder.

Figure 1:
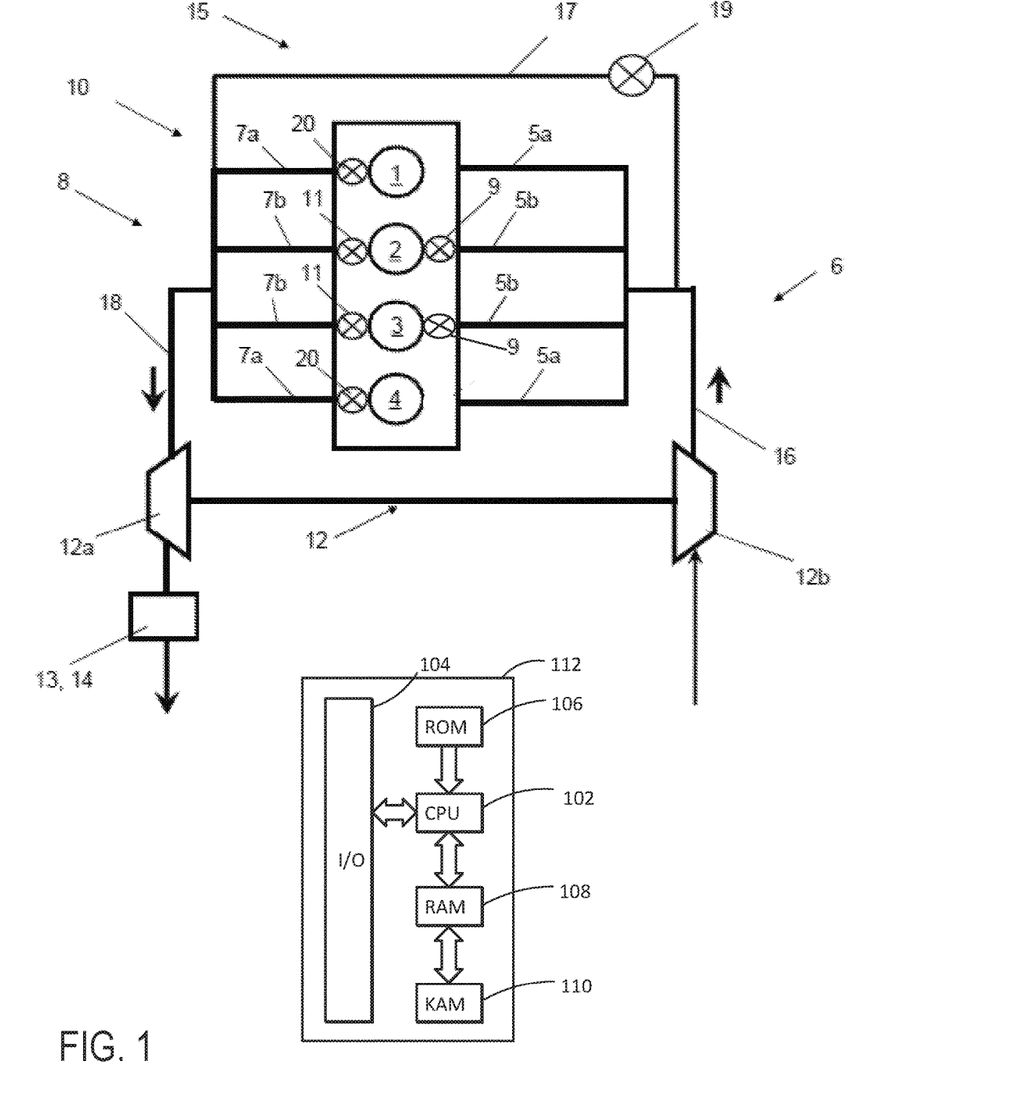
FIG. 1 schematically shows an embodiment of the internal combustion engine.

Turning now to the figures, FIG. 1 schematically shows an embodiment of the internal combustion engine 10. FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The internal combustion engine is a four-cylinder in-line engine 10 with direct injection, in which the four cylinders 1, 2, 3, 4 are arranged along the longitudinal axis of the cylinder head, that is to say in a line, and are equipped in each case with an injector for injecting fuel, wherein the injected fuel quantity serves for adjusting the air-fuel ratio λ (not illustrated).

Each cylinder 1, 2, 3, 4 has an intake line 5a, 5b for the supply of charge air via an intake system 6, and an exhaust line 7a, 7b for the discharge of the exhaust gases via an exhaust-gas discharge system 8. As shown, cylinders 1 and 4 are each coupled to intake line 5a and exhaust line 7a, while cylinders 2 and 3 are each coupled to intake line 5b and exhaust line 7b, The internal combustion engine 10 is, for the purposes of supercharging, equipped with an exhaust-gas turbocharger 12, wherein the turbine 12a is arranged in an overall exhaust line 18 of the exhaust-gas discharge system 8, and the compressor 12b is arranged in an overall intake line 16 of the intake system 6. The fresh air supplied to the internal combustion engine 10 is compressed in the compressor 12b, for which purpose the enthalpy of the exhaust-gas flow is utilized in the turbine 12a. For the aftertreatment of the exhaust gas, a particle filter 14 which serves as exhaust-gas aftertreatment system 13 is provided in the overall exhaust line 18 downstream of the turbine 12a.

The internal combustion engine 10 is furthermore equipped with an exhaust-gas recirculation arrangement 15, specifically with a high-pressure EGR arrangement. For this purpose, a recirculation line 17 branches off from the exhaust-gas discharge system 8 upstream of the turbine 12a and opens into the intake system 6 downstream of the compressor 12b. A valve 19 for adjusting the recirculated exhaust-gas flow rate is arranged in the recirculation line 17 of the exhaust-gas recirculation arrangement 15.

The four cylinders 1, 2, 3, 4 are configured and form two groups with in each case two cylinders, wherein the two outer cylinders 1, 4 form a first group. The cylinders 1, 4 of the first group are in operation even in the event of a partial deactivation of the internal combustion engine 10. The two inner cylinders 2, 3 form a second group, the cylinders 2, 3 of which are formed as load-dependently switchable cylinders 2, 3 which are deactivated during a partial deactivation.

Each inlet opening of each cylinder 2, 3 of the second group is equipped with a partially variable valve drive 9, the inlet valve of which is a switchable inlet valve, wherein a deactivated inlet valve shuts off the associated inlet opening and an activated inlet valve opens up the associated inlet opening during an opening duration $\Delta t_{2,in}$, and in the process forms a valve lift $\Delta h_{2,in}$. Thus, each inlet opening of each cylinder of the second group of cylinders is regulated by a respective inlet valve that is switchable via a partially variable valve drive. When activated, the inlet valves are actuated (e.g., opened and closed) to control flow of charge air into the cylinders 2, 3. When deactivated, the inlet valves are not actuated and remain closed, preventing admission of charge air into the cylinders 2, 3.

Each outlet opening of each cylinder 2, 3 of the second group is equipped with a partially variable valve drive 11, the outlet valve of which is a switchable outlet valve, wherein a deactivated outlet valve shuts off the associated outlet opening and an activated outlet valve opens up the associated outlet opening during an opening duration $\Delta t_{2,ex}$, and in the process forms a valve lift $\Delta h_{2,ex}$. Thus, each outlet opening of each cylinder of the second group of cylinders is regulated by a respective outlet valve that is switchable via a partially variable valve drive. When activated, the outlet valves are actuated (e.g., opened and closed) to control flow of exhaust gas out of the cylinders 2, 3. When deactivated, the outlet valves are not actuated and remain closed, preventing release of exhaust gas out the cylinders 2, 3.

In the present case, the cylinders 2, 3 of the second group are formed as activatable cylinders 2, 3 which are deactivated in part-load operation when a predefinable load is undershot. In the present case, the deactivation is realized by virtue of the fuel injection being deactivated and the inlet-side and outlet-side valves being deactivated. The load demand on the cylinders 1, 4 of the first group, which remain in operation, is increased in this way, which cylinders are then operated at higher loads with a lower specific fuel consumption. This results in an improvement in efficiency.

Each outlet opening of each cylinder 1, 4 that is operational even during partial deactivation of the internal combustion engine 10 is equipped with a partially variable valve drive 20, the outlet valve of which is adjustable with regard to the control time for opening.

During the operation of the partially deactivated internal combustion engine 10, the adjustable outlet valves of the first cylinder group are opened relatively early, whereby the temperature of the exhaust gas supplied to the turbine 12a is increased. A higher exhaust-gas enthalpy ensures a higher charge pressure, such that more charge air can be supplied to the cylinders 1, 4 that remain operational during partial deactivation.

Herein, the terms "inlet opening" and "inlet valve" may be used interchangeably with the terms "intake opening" and "intake valve," respectively. Likewise, the terms "outlet opening" and "outlet valve" may be used interchangeably with the terms "exhaust opening" and "exhaust valve," respectively. As such, the inlet openings described above may be referred to as intake openings, the inlet valves described above may be referred to as intake valves, the outlet openings described above may be referred to as exhaust openings, and the outlet valves described above may be referred to as exhaust valves.

The engine system may further include a control system. The control system may include a controller 112. The controller 112 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 112 may receive various signals from sensors coupled to engine 1, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 112 from signal PIP.

Storage medium read-only memory 106 can be programmed with computer readable data representing instructions executable by processor 102 for performing the methods described below as well as other variants that are anticipated but not specifically listed. Example methods are described with reference to FIG. 2.

The controller 112 receives signals from the various sensors of FIG. 1 and employs the various actuators of FIG. 1 to adjust engine operation based on the received signals and instructions stored on a memory of the controller. For example, the controller may receive signals from various sensors indicating engine speed and load, and the controller may adjust one or more actuators each associated with a respective deactivatable cylinder (e.g., exhaust valve actuators, intake valve actuators, fuel injectors) based on the received signals such that the deactivatable cylinders are activated or deactivated based on engine load, for example. In an example, to maintain charge pressure and catalyst temperature during cylinder deactivation, the controller may receive signals from various sensors indicating engine load, charge pressure, etc., and adjust the exhaust valve timing of the non-deactivatable cylinders.

Thus, the engine described herein includes two cylinder groups. A first group of the two cylinder groups includes non-deactivatable cylinders, wherein the cylinders operate even during mid-to-low engine load conditions. A second group of the two cylinder groups includes deactivatable cylinders, wherein the cylinders are configured to be deactivated during certain conditions, such as during mid-to-low engine load conditions (e.g., when engine load is 30% of maximum rated load or lower). The second group of cylinders may be deactivated by deactivating fuel injection to those cylinders and deactivating intake and exhaust valve actuation. During cylinder deactivation, when the cylinders of the first cylinder group remain active, increased fuel is injected into the cylinders of the first cylinder group and additional intake air is inducted into those cylinders.

During certain conditions, the exhaust valve timing of the first cylinder group may be adjusted via a variable valve drive. The variable valve drive may adjust when the exhaust valves are opened. For example, during the cylinder deactivation of the second cylinder group, the exhaust valves of the cylinders of the first group of cylinders may be adjusted to open earlier than when all cylinders are active. In doing so, a larger volume of higher temperature exhaust may be released from the first group of cylinders to the exhaust system, increasing turbine speed and hence increasing charge pressure.

Figure 2:
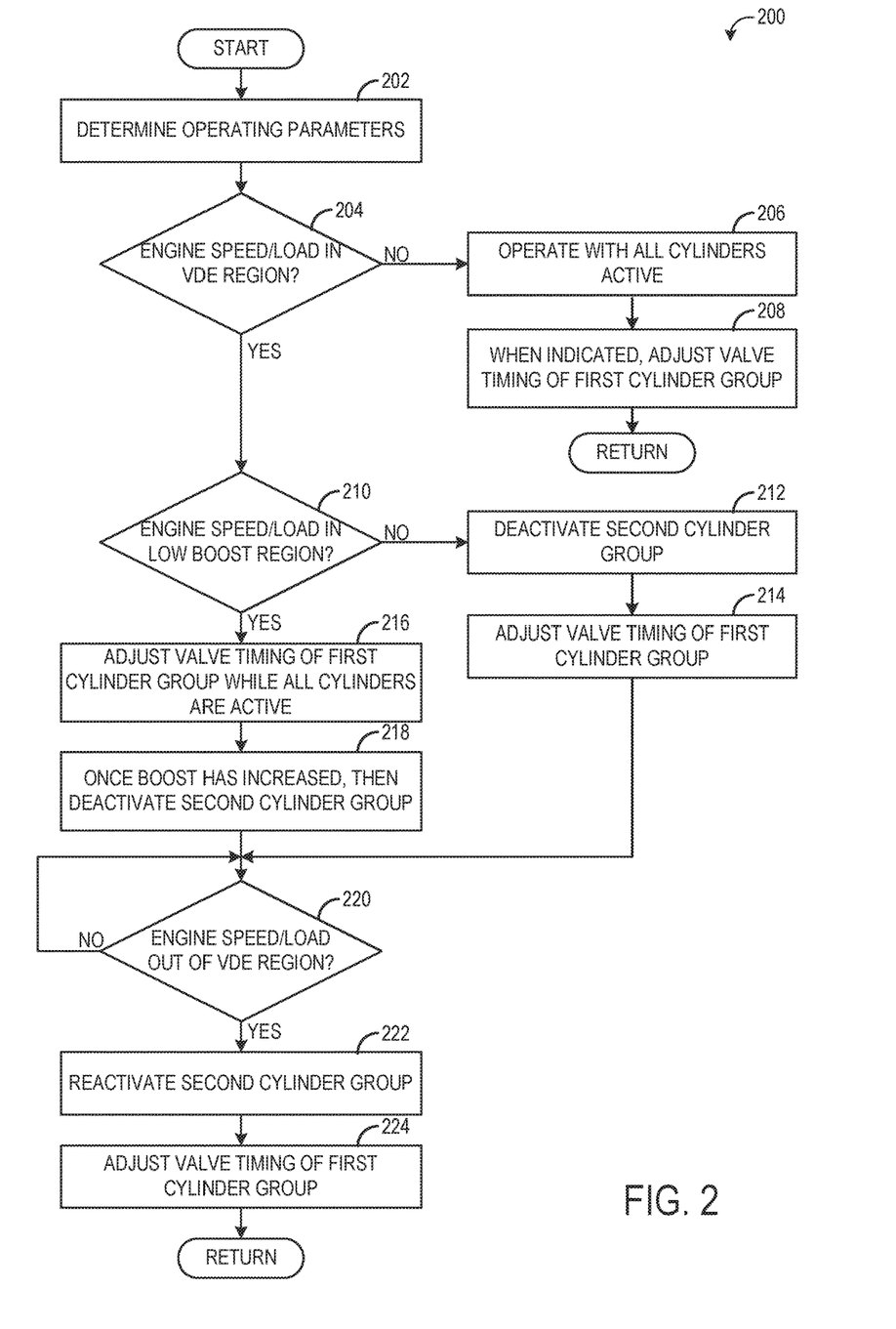
FIG. 2 is a flow chart illustrating a method for operating an engine.

FIG. 2 is a flow chart illustrating a method 200 for operating an engine, such as the engine 10 of FIG. 1. Instructions for carrying out method 200 and the rest of the methods described herein may be executed by a controller based on instructions stored on a memory of the controller (e.g., controller 112) and in conjunction with signals received from sensors of the engine system, such as the sensors described above with reference to FIG. 1. The controller may employ engine actuators of the engine system to adjust engine operation, according to the methods described below.

Figure 4:
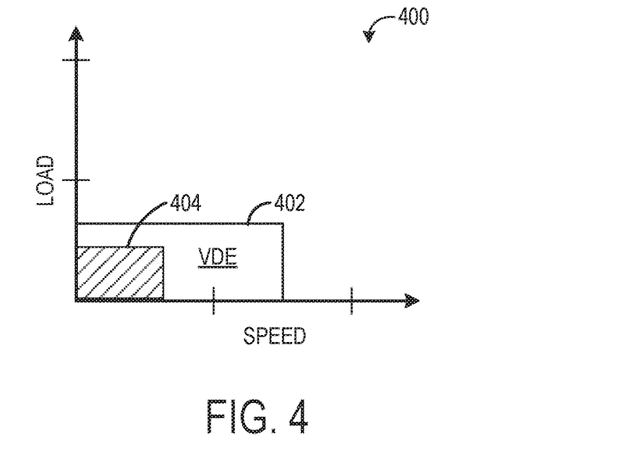
FIG. 4 is an example speed-load map.

At 202, method 200 includes determining operating parameters. The determined operating parameters may include engine speed, engine load, aftertreatment device temperature, charge pressure, and other suitable parameters. At 204, method 200 determines if engine speed and load are within a variable displacement engine (VDE) region. The VDE region may include engine operating points with load under a threshold load, such as 30% of maximum rated load, and speed under a threshold speed, such as 2500 RPM. An example speed-load map 400 that may be stored in memory of the controller is illustrated in FIG. 4. A VDE region 402 includes all speed-load points under a threshold load and under a threshold speed.

If the engine is not operating in the VDE region, for example if the engine is operating with load above the threshold load and/or speed above the threshold speed, method 200 proceeds to 206 to operate with all cylinders active. When all cylinders are active, each cylinder receives fuel and each cylinder operates with at least one active intake valve and at least one active exhaust valve. In some examples, method 200 includes, at 208, adjusting the valve timing of the first cylinder group, when indicated. As explained above, the first cylinder group may include a variable valve drive that may adjust the opening and/or closing time of the exhaust valves of the first cylinder group. The exhaust valve timing of the first cylinder group may be adjusted to open each exhaust valve at a timing earlier in the respective cylinder's cycle relative to non-adjusted exhaust valve timing. In doing so, the duration of the exhaust valve being open (and hence duration that exhaust gas is expelled from the cylinder) may be extended and higher temperature exhaust may be released from the cylinder. Operating conditions where it may be desirable to operate with adjusted exhaust valve timing include cold engine start (in order to expedite aftertreatment device warm-up) or other suitable conditions. Method 200 then returns.

If it is determined that the engine is operating in the VDE region, method 200 proceeds to 210 to determine if the engine is operating with speed and load in a low boost region. The low boost region may be within the VDE region, and may include engine operating points below a second threshold load (lower than the VDE region threshold load) and below a second threshold speed (lower than the VDE region threshold speed). For example, referring to map 400 of FIG. 4, the hatched-line box is a low-boost region 404. During operation in the low-boost region, adjustment of the exhaust valve timing of the active cylinders may result in a drop in boost pressure, even though the early valve opening directs additional hot exhaust to the turbine, due to release of the cylinder pressure before completion of combustion and/or before maximum work may be obtained from a respective cylinder piston. Thus, during operation the low-boost region, it may be beneficial to adjust in the manner in which the cylinders are deactivated and the valve timing is adjusted, as will be explained below.

If the engine is not operating in the low-boost region, method 200 proceeds to 212 to deactivate at least one cylinder of the second cylinder group. As explained previously, to deactivate a cylinder, the fuel injection to that cylinder is disabled and actuation of the intake valve(s) and exhaust valve(s) of that cylinder are deactivated. When the at least one cylinder of the second cylinder is deactivated, remaining active cylinders will undergo an increase in load (e.g., increased fuel injection amount and increased charge air) to maintain torque. In doing so, the active cylinders may operate with increased efficiency, increasing fuel efficiency.

In some examples, during operation with partial cylinder deactivation (e.g., where one or more of the cylinders of the second cylinder group are deactivated), the total mass flow of charge air and then exhaust gas through the engine may decrease. This may lead to reduced turbine speed, charge pressure, and engine output, thus limiting the load range during which the deactivation can take place. Accordingly, to counter this drop in charge pressure, the valve timing of at least one of the active cylinders may be adjusted. For example, the exhaust valve(s) of at least one active cylinder may be adjusted such that the valve(s) are opened early relative to operation with no cylinder deactivation.

Thus, method 200 includes, at 214, adjusting the valve timing of the first cylinder group. This may include advancing the timing of when the exhaust valves of the first cylinder group are opened. This makes it possible, during the operation of the partially deactivated internal combustion engine, for the at least one exhaust valve of the first cylinder group to be opened relatively early. By this measure, the temperature of the exhaust gas supplied to the turbine can be increased, such that exhaust gas of greater enthalpy is made available at the turbine inlet of the turbocharger. A greater exhaust-gas enthalpy yields a higher turbine pressure ratio, and thus a higher charge pressure ratio, as a result of which more charge air may be supplied to the active cylinders during partial deactivation, thus expanding the load range in which deactivation is effective and improving the engine torque characteristic. The exhaust valve timing of the first cylinder group may be adjusted each time the cylinders of the second cylinder group are deactivated. However, in other examples the exhaust valve timing may be adjusted only when the second cylinder group is deactivated and certain operating conditions have been met, such as load below a second threshold (lower than the threshold for initiating deactivation), exhaust gas temperature below a threshold temperature, or other conditions. After adjusting the valve timing of the first cylinder group, method 200 proceeds to 220 to assess engine operation again, which will be explained in more detail below.

Returning to 210, if it is determined that the engine is operating in the low-boost region, method 200 proceeds to 216 to adjust the valve timing of the cylinders of the first cylinder group while all cylinders are still active. Similar to the valve timing adjustment described above, the valve timing adjustment performed at 216 includes advancing the opening timing of the exhaust valves, so that the exhaust valves open earlier during the combustion stroke, for example. By adjusting valve timing while the cylinders are all active, rather than adjusting the valve timing concurrent with or after deactivation of the deactivatable cylinders, the boost pressure may be transiently increased before deactivation, which may reduce or prevent a boost loss upon deactivation. Correspondingly, the valve deactivation may be delayed until a desired increased boost pressure is achieved (e.g., via closing a wastegate and then waiting for the desired boost pressure increase to be achieved, for example). At 218, method 200 includes deactivating the second cylinder group once boost pressure has increased.

At 220, method 200 determines if engine operation has moved out of the VDE region. If not, method 200 loops back to 220 to continue to operate with the second cylinder group deactivated and the valve timing of the first group adjusted. If engine operation has moved out of the VDE region, for example if engine speed and/or load has increased, method 200 proceeds to 222 to reactivate the cylinders of the second cylinder group, by activating fuel injection and actuating the intake and exhaust valves of those cylinders. At 224, method 200 includes adjusting the valve timing of the cylinders of the first cylinder group, such as by retarding the timing that the exhaust valves open. Method 200 then returns.

Figure 3:
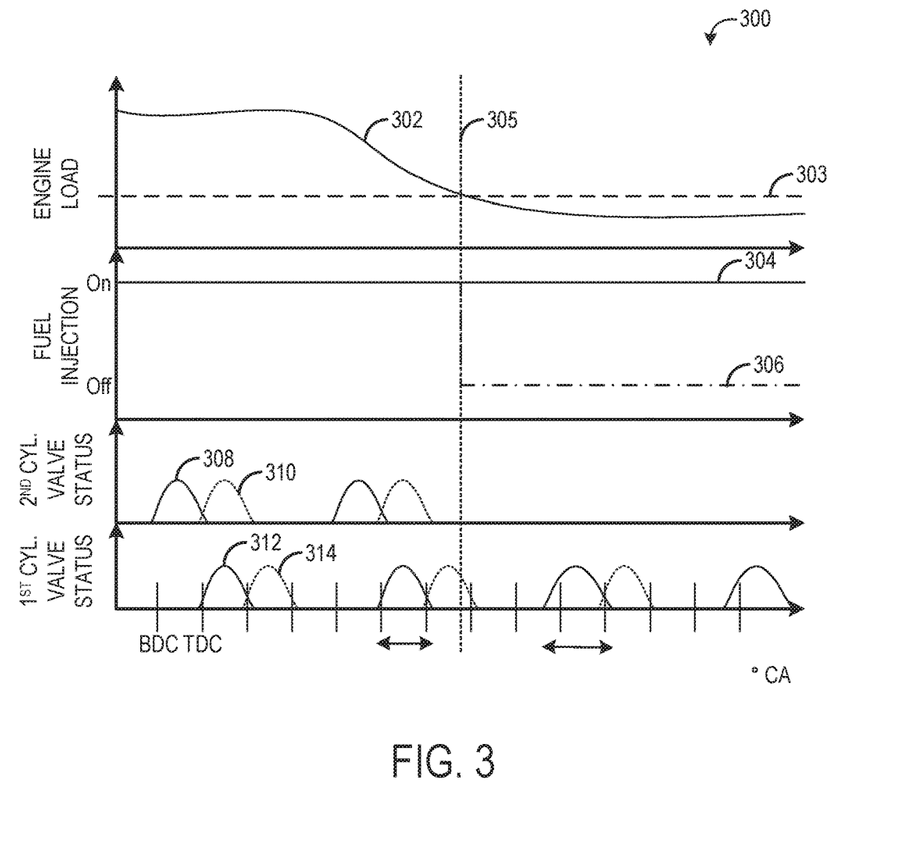
FIG. 3 is a diagram illustrating example operating parameters that may be observed during execution of the method of FIG. 2.

FIG. 3 is a diagram 300 illustrating various operating parameters that may be observed during execution of method 200, for example. Diagram 300 includes a plot of engine load, shown by curve 302, a plot of fuel injection status for the first cylinder group (curve 304), a plot of fuel injection status for the second cylinder group (curve 306), a plot of exhaust and intake valve status for the second cylinder group (curves 308 and 310, respectively), and a plot of exhaust and intake valve status for the first cylinder group (curves 312 and 314, respectively). For each plot of diagram 300, engine position (in degrees crank angle, for example) is plotted along the horizontal, x-axis while the values for each respective operating parameter are plotted along the vertical, y-axis. The hash marks along the x-axis represent alternating bottom dead center (BDC) and top dead center (TDC) positions of the piston of a representative cylinder of the first cylinder group. A line 303 denotes a threshold engine load while a line 305 denotes engine position when a switch to operation in the partial deactivation mode is made.

During engine operation prior to line 305 (e.g., to the left of line 305), engine load is above the threshold load. As such, all cylinders are active, as shown by fuel injection being active for the cylinders of both the first cylinder group and second cylinder group. Likewise, the intake and exhaust valves for the cylinders of both the first cylinder group and the second cylinder group are active. For example, curve 308 shows actuation of an exhaust valve of a cylinder of the second cylinder group during a respective exhaust stroke for that cylinder. Curve 312 shows actuation of an exhaust valve of a cylinder of the first cylinder group during a respective exhaust stroke for that cylinder. For each exhaust valve actuation event prior to line 305, the exhaust valves open approximately when the respective piston of the associated cylinder is at top dead center, and closes when the piston is at bottom dead center.

At a time corresponding to line 305, the engine load drops to below the threshold engine load. As such, operation in the partial deactivation mode commences. Fuel injection to the second group of cylinders is turned off, as shown by curve 306, while fuel injection to the first group of cylinders remains active, as shown by curve 304. Intake and exhaust valve actuation is deactivated for the second group of cylinders, while intake and exhaust valve actuation remains active for the first group of cylinders. However, the timing of the opening of the exhaust valves of the first cylinder group is adjusted following the transition to the partial deactivation mode, to an earlier timing. Thus, as shown, after line 305, the exhaust valve actuation of the illustrated cylinder of the first cylinder group (shown by curve 312) occurs earlier relative to the timing before line 305. For example, the exhaust valve begins to open prior to TDC, in the middle of the combustion stroke preceding the exhaust stroke. Because the exhaust valve closes at the same time as before the operation in partial deactivation mode, the duration that the exhaust valve is open increases. Further, while the valve lift is illustrated as remaining constant, it is to be understood that in some examples, the valve lift may also be adjusted. In contrast, in diagram 300, the intake valve of the cylinder of the first group of cylinders maintains the same timing (opening and closing) as before the partial deactivation mode.

An embodiment of a method for an engine having a first cylinder group and a second cylinder group is provided. The method includes, responsive to engine operation in a first engine speed-load region, deactivating one or more cylinders of the second cylinder group, and responsive to the deactivating, adjusting exhaust valve timing of one or more cylinders of the first cylinder group. The method further includes responsive to engine operation in a second engine speed-load region, adjusting exhaust valve timing of the one or more cylinders of the first cylinder group, and responsive to the adjusting, deactivating the one or more cylinders of the second cylinder group. In an example, adjusting exhaust valve timing comprises advancing exhaust valve opening timing.

In an example, deactivating one or more cylinders of the second cylinder group, and responsive to the deactivating, adjusting exhaust valve timing of one or more cylinders of the first cylinder group comprises first deactivating one or more cylinders of the second cylinder group, and then adjusting exhaust valve timing of the one or more cylinders of the first cylinder group once the one or more cylinders of the second cylinder are deactivated. Adjusting exhaust valve timing of the one or more cylinders of the first cylinder group, and responsive to the adjusting, deactivating the one or more cylinders of the second cylinder group comprises first adjusting exhaust valve timing of the one or more cylinders of the first cylinder group, and then deactivating the one or more cylinder of the second cylinder group once the exhaust valve timing of the one or more cylinders of the first cylinder group has been adjusted.

In an example, the second engine speed-load region comprises engine operating points with engine load below a first threshold load and with engine speed below a first threshold speed, and the first engine speed-load region comprises engine operating points with engine load above the first threshold load and below a second threshold load and with engine speed above the first threshold speed and below a second threshold speed.

An embodiment of a system includes an engine including a first cylinder and a second cylinder, the first cylinder including a first intake valve and a first exhaust valve, the second cylinder including a second intake valve and a second exhaust valve, a variable valve drive configured to actuation of the first intake valve, second intake valve, first exhaust valve, and second exhaust valve, and a controller storing instructions in memory that when executed cause the controller to, responsive to engine load below a threshold load, adjust the variable valve drive to deactivate actuation of the second intake valve and second exhaust valve and advance an opening timing of the first exhaust valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine including a first cylinder and a second cylinder, the first cylinder including a first intake valve and a first exhaust valve, the second cylinder including a second intake valve and a second exhaust valve;
a variable valve drive configured to actuate the first intake valve, the second intake valve, the first exhaust valve, and the second exhaust valve; and
a controller storing instructions in memory that when executed cause the controller to, responsive to engine load below a threshold load, adjust the variable valve drive to deactivate actuation of the second intake valve and the second exhaust valve and advance an opening timing of the first exhaust valve.

2. A supercharged internal combustion engine, comprising:
at least three cylinders, each cylinder having at least one outlet opening which is adjoined by an exhaust line for discharging exhaust gases via an exhaust-gas discharge system and at least one inlet opening which is adjoined by an intake line for supply of charge air via an intake system, the at least three cylinders arranged into at least two groups with at least one cylinder in the at least two groups,
a first group of the at least two groups including a cylinder which is in operation during a partial deactivation of the internal combustion engine, and
a second group of the at least two groups including a load-dependently switchable cylinder,
the at least one outlet opening of at least one cylinder of the first group equipped with a first at least partially variable valve drive and at least one cylinder of the second group equipped with a second at least partially variable valve drive, with a valve which opens up or shuts off an associated at least one outlet opening and which is adjustable at least with regard to a control time for opening, the valve realizing a valve lift $\Delta h_{1,ex}$ between an open position and a closed position and opening up the associated outlet opening during an opening duration $\Delta t_{1,ex}$;
an exhaust-gas turbocharger comprising a turbine arranged in the exhaust-gas discharge system and a compressor arranged in the intake system;
an exhaust-gas recirculation arrangement; and
a controller storing instructions that when executed cause the controller to deactivate at least one cylinder of the second cylinder group, and to adjust the at least partially variable valve drive to open the associated at least one outlet opening relatively advanced to an opening timing of the associated at least one outlet opening during a cylinder cycle of the at least one cylinder of the second cylinder group immediately prior to being deactivated.

3. The supercharged internal combustion engine as claimed in claim 2, wherein each of the first at least partially variable valve drive and the second at least partially variable valve drive is adjusted to open the associated at least one outlet opening while combustion is still taking place.

4. The supercharged internal combustion engine as claimed in claim 2, wherein the at least one outlet opening of the at least one cylinder of the first group is equipped with the first at least partially variable valve drive.

5. The supercharged internal combustion engine as claimed in claim 2,
wherein the first group includes two cylinders; and
wherein each of the at least one outlet opening of every cylinder of the two cylinders of the first group is equipped with the first at least partially variable valve drive.

6. The supercharged internal combustion engine as claimed in claim 2,
wherein the second group includes two cylinders; and
wherein each of the at least one outlet opening of every cylinder of the two cylinders of the second group is equipped with the second at least partially variable valve drive.

7. The supercharged internal combustion engine as claimed in claim 6, wherein each outlet valve of every cylinder of the two cylinders of the second group is a switchable outlet valve, that when deactivated shuts off the associated at least one outlet opening and when activated opens up the associated at least one outlet opening during an opening duration $\Delta t_{2,ex}$, forming a valve lift $\Delta h_{2,ex}$.

8. The supercharged internal combustion engine as claimed in claim 2,
wherein the second at least partially variable valve drive further comprises a partially variable valve drive element in the exhaust line of the at least one load-dependently switchable cylinder, by which a cross sectional flow in the exhaust line is varied and by which the exhaust gases discharging from the at least one deactivated cylinder of the second group during the partial deactivation of the internal combustion engine is controlled.

9. The supercharged internal combustion engine as claimed in claim 2, wherein each of the at least one inlet opening of every cylinder of the second group is equipped with an at least partially variable valve drive, with an inlet valve which opens up or shuts off an associated at least one inlet opening, realizing a valve lift $\Delta h_{2,in}$ between an open position and a closed position and opening up the associated at least one inlet opening during an opening duration $\Delta t_{2,in}$.

10. The supercharged internal combustion engine as claimed in claim 9, wherein each of the inlet valve of every cylinder of the second group is a switchable inlet valve that when deactivated shuts off the associated at least one inlet opening and when activated opens up the associated at least one inlet opening during an opening duration $\Delta t_{2,in}$, forming a valve lift $\Delta h_{2,in}$.

11. The supercharged internal combustion engine as claimed in claim 2, wherein the at least partially variable valve drive comprises a partially variable valve drive element is provided in the intake line of the at least one load-dependently switchable cylinder, by a cross sectional flow in the intake line is varied, whereby a charge-air flow rate supplied to the at least one deactivated cylinder during the partial deactivation of the internal combustion engine is adjusted.

12. The supercharged internal combustion engine as claimed in claim 2, wherein the at least three cylinders includes four cylinders in an in-line arrangement, wherein two outer cylinders and two inner cylinders form in each group.

13. The supercharged internal combustion engine as claimed in claim 2, wherein each of the at least one outlet opening of every cylinder of the second group and each of the at least one inlet opening of every cylinder of the second group is held closed during the partial deactivation of the internal combustion engine.

14. The supercharged internal combustion engine as claimed in claim 2, wherein a predefinable minimum flow rate of charge air is supplied to the at least one deactivated cylinder.

15. The supercharged internal combustion engine as claimed in claim 2, wherein fuel injection to the load-dependently switchable cylinder is deactivated during the partial deactivation of the internal combustion engine.

16. A cylinder deactivation method for an engine having a first cylinder group and a second cylinder group, comprising:
receiving input from one or more sensors to a controller;
deactivating one or more cylinders of the second cylinder group via the controller while operating the engine in a first speed-load region, and adjusting exhaust valve timing of one or more valves at outlets of one or more cylinders of the first cylinder group responsive to the one or more cylinders of the second cylinder group being deactivated; and
adjusting the valve timing of the one or more valves at the outlets of the one or more cylinders of the first cylinder group via the controller while operating the engine in a second speed-load region, and deactivating the one or more cylinders of the second cylinder group responsive to the valve timing of the one or more valves at the outlets of the one or more cylinders of the first cylinder group being adjusted.

17. The method of claim 16, wherein adjusting exhaust valve timing comprises advancing valve opening timing via a variable valve drive.

18. The method of claim 16, wherein deactivating one or more cylinders of the second cylinder group, and adjusting valve timing of the one or more valves at the outlets of the one or more cylinders of the first cylinder group responsive to the deactivating comprises:
first deactivating one or more cylinders of the second cylinder group, and then adjusting valve timing of one or more cylinders of the first cylinder group once the one or more cylinders of the second cylinder group are deactivated;
wherein adjusting exhaust valve timing of the one or more cylinders of the first cylinder group, and deactivating the one or more cylinders of the second cylinder group responsive to the adjusting comprises:
first adjusting valve timing of the one or more valves at the outlets of the one or more cylinders of the first cylinder group, and then
deactivating the one or more cylinders of the second cylinder group once the valve timing of the one or more valves of the outlets of the one or more cylinders of the first cylinder group has been adjusted.

19. The method of claim 16,
wherein the second engine speed-load region comprises engine operating points with engine load below a first threshold load and with engine speed below a first threshold speed; and
wherein the first speed-load region comprises engine operating points with engine load above the first threshold load and below a second threshold load and with engine speed above the first threshold speed and below a second threshold speed.

* * * * *